March 3, 1964 G. C. ELVERS, SR 3,123,362
FERTILIZER GUN
Filed May 24, 1963 2 Sheets-Sheet 1

INVENTOR.
GEORGE C. ELVERS, SR.
BY
McMorrow, Berman & Davidson
ATTORNEYS

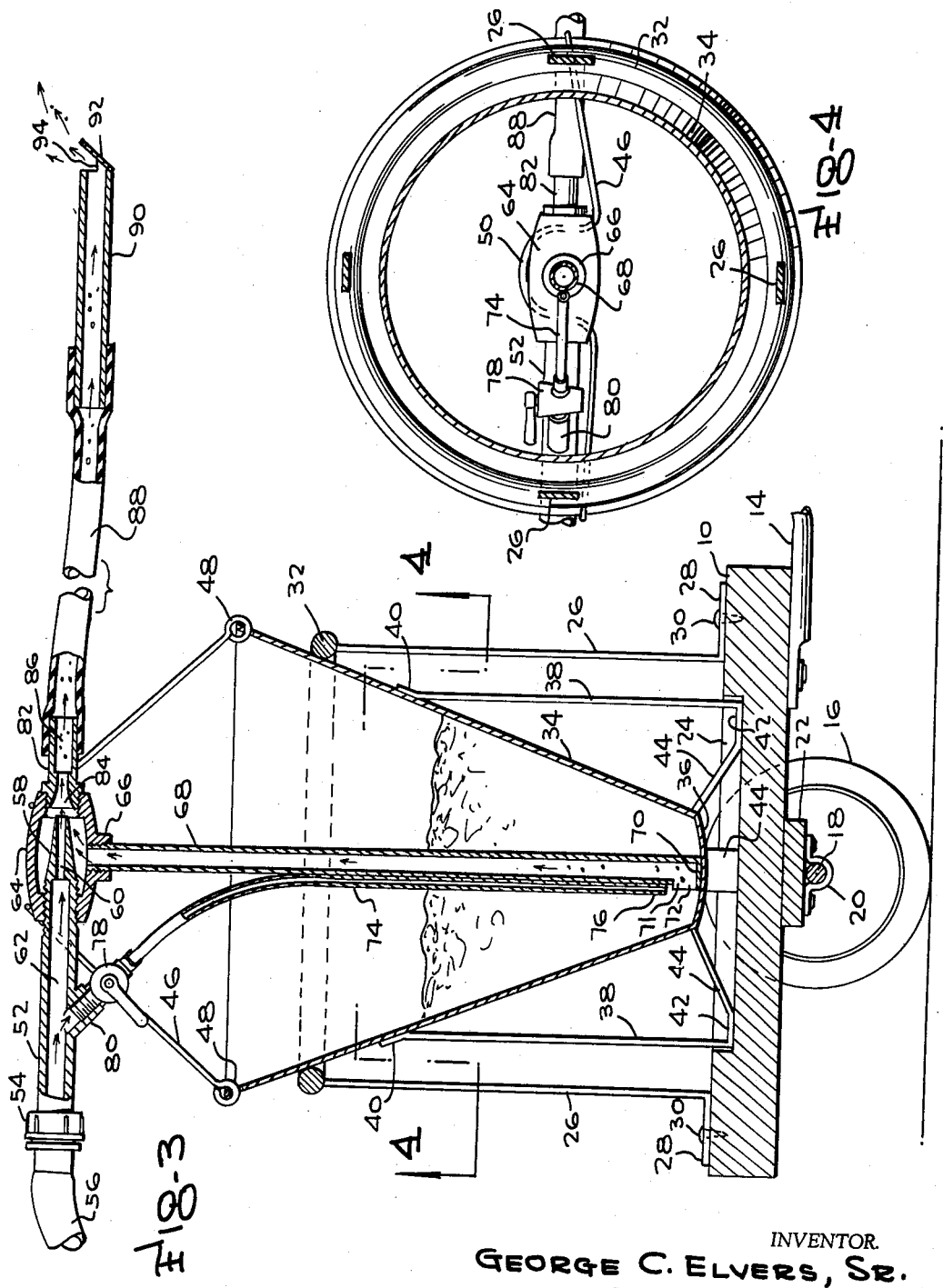

United States Patent Office 3,123,362
Patented Mar. 3, 1964

3,123,362
FERTILIZER GUN
George C. Elvers, Sr., 5002 Euclid Ave. W., Tampa, Fla.
Filed May 24, 1963, Ser. No. 283,062
10 Claims. (Cl. 275—1)

This invention relates to spray guns, in general, and in particular to a pressure system which draws a conditioning agent into the main stream of a fluid supply. More specifically, the invention relates to a device for conveying metered amounts of fertilizer from a portable source of supply to an area to be treated.

In spite of numerous proposals along the general lines aforesaid, the application of fertilizer to lawns, or other areas of deposit, is still, for the most part, accomplished by broadcasting solid particles of fertilizer, by suitable means, such as a portable hopper, with or without such appendages as shakers and screens. This basic and somewhat primitive approach is necessarily attended with certain shortcomings, and it is a general object of the present invention to obviate such shortcomings.

More particularly, it may be said that commercially available, solid fertilizer is likely to include unduly large particles or conglomerations, and this condition is likely to be aggravated in proportion to the period of storage, either by the merchant or the consumer, and it is one object of the invention to provide for suitable reduction of sizes during dispensing.

Another specific difficulty of the prior art, which is also related, in part, to the particle size problem, is the difficulty of accurate metering to provide even distribution, resulting in spotty treatment of the area of deposit, as well as waste and inefficiency, and it is a further object to ameliorate these conditions.

Yet another object is to avoid the harmful effects on plant life due to promiscuous scattering of dry fertilizer, as well as to eliminate the dust problem incident to dry scattering.

A still further object is to speed up the operation of depositing fertilizer, or other conditioner.

The objects also include the provision of a delivery system which is relatively simple in structure, easy of manufacture and maintenance, yet durable and reliable in use, and low in cost.

These and other objects, which will be apparent, are attained by the present invention, a preferred form of which is described in the following specification, as illustrated in the drawing, in which:

FIGURE 3 is a sectional view at right angles to that of FIGURE 2, taken on the plane of the line 3—3 of FIGURE 2.

FIGURE 4 is a transverse sectional view through the hopper, taken on the plane of the line 4—4 of FIGURE 3.

Figure 1:
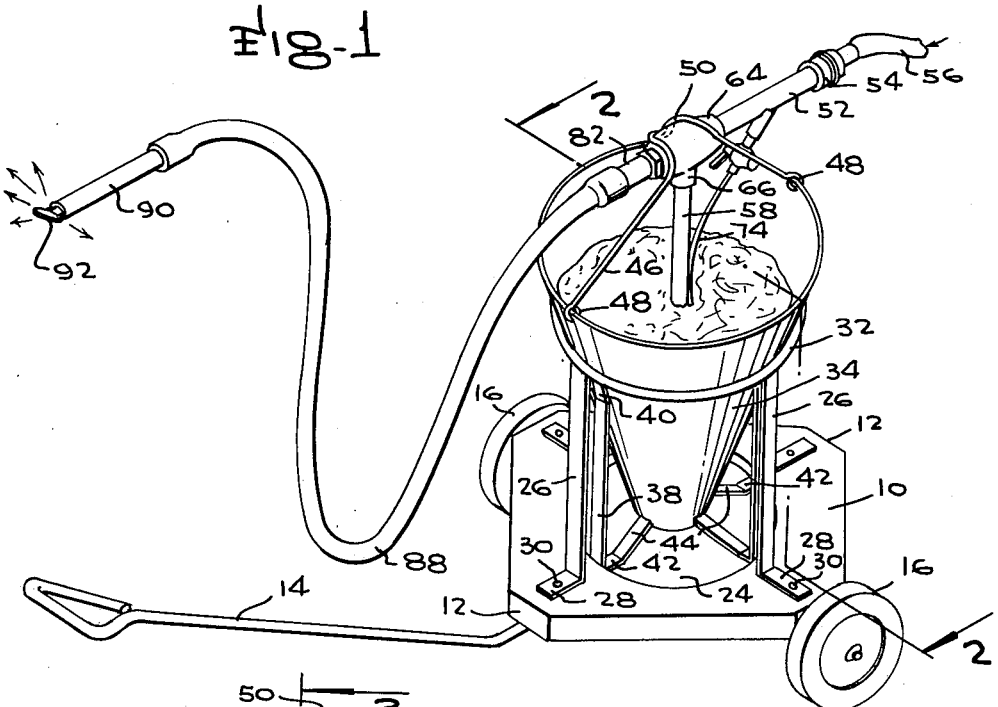
FIGURE 1 is a perspective view of a fertilizer gun and associated hopper, according to the invention, mounted on a hand cart.
Figure 2:
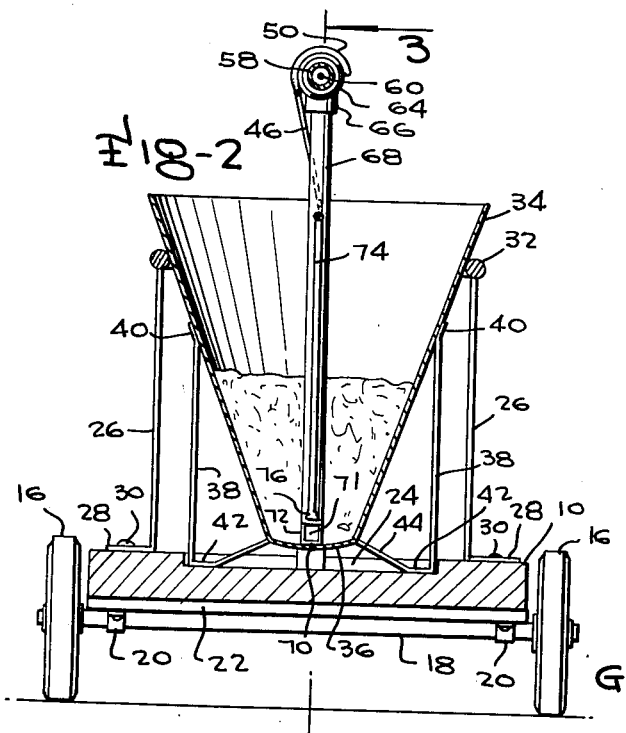
FIGURE 2 is a sectional view of the system shown in FIGURE 1, taken on the central, vertical plane indicated by the staggered line 2—2 of FIGURE 1.

Referring to the drawings by characters of reference there is shown, in FIGURE 1, a two-wheeled tote cart comprising a square platform 10, with truncated corner areas 12, a handle 14, and a pair of wheels 16 carried on an axle 18, mounted in suitable brackets 20, secured to a reinforcing cross strip 22 on the underside of the platform, the cross strip and the axle being arranged to parallel the direction of a diagonal of the square.

Centrally of its area on its top side, the platform 10 has a cylindrical cavity 24 which constitutes a positioning repository for the hopper presently to be described. A series of four upright straps 26 have laterally bent, lower feet 28, secured by screws 30 to the platform 10 in the truncated corner areas, and a ring 32, of circular cross section, is secured by welding to the top edges of uprights 26, and also constitute a support and a positioning means for the hopper.

A hopper 34, with a side wall of inverted, generally frusto-conical form, is open at the top, which is the wide end, or cone base, and has a downwardly convex, closed bottom 36. The upper, open end of the hopper is of somewhat greater diameter than the ring 32, so that the ring serves as a support for the hopper, which is additionally supported, and held against lateral movement, by a spider arrangement, comprising four vertically disposed straps 38, arranged at 90° intervals about the hopper, and having bent, upper tabs 40, welded to the hopper, lower horizontal sections 42, adapted to nest in cavity 24, near the outer side wall thereof, and upwardly bent sections 44, leading from the horizontal sections, or feet 42, and end welded to the side wall of the hopper at the bottom corner thereof. A bale 46, with end loops 48 engaged in suitable openings in the hopper wall near the upper rim thereof, has a cylindrically looped, central portion 50, for cooperation with the pipe structure of the gun, as will be seen.

Figure 5:
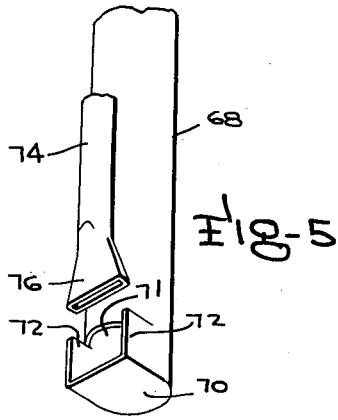
FIGURE 5 is an enlarged view, in perspective, of a detail at the lower end of one arm of the gun.

The gun itself is shown to best advantage in FIGURE 3, wherein the inlet pipe 52 is shown as connected to the coupling nipple 54 of a garden hose 56, or other suitable supply conduit. The outer portion 58 of pipe 52 has a conical taper, with a restricted bore 60, substantially less in diameter than the main bore 62, and the pipe carries threads rearwardly of head 58, by which it is attached to one opening of the cross arm of a T-fitting 64, the upright arm 66 of which threadedly carries an auxiliary pipe 68, having a closed bottom 70, which dwells on the central, low zone of the bottom 36 of the hopper. As seen in FIGURE 5, the tube 68 is slit and spread, at its lower end, to provide a lateral opening 71 with side wings 72, and the bottom plate 70 has a U-form to correspond therewith.

Communication between the inlet pipe 52 and the bottom opening 71 of central pipe 68 is provided by a tube or conduit 74, of relatively small bore in comparison to pipes 52 and 68, the tube 74 being secured tangentially to pipe 68 for most of its vertical height, and having a flattened, or fishtail open, lower end 76, adjacent the bottom opening 71 in pipe 68, and threadedly secured at its upper end to a valve or cock 78, threaded in an obliquely disposed port or nipple 80 on pipe 52 and communicating with the interior thereof.

The main flow, from pipe 52 through T-fitting 64, is continued by means of a tubular nipple 82, threadedly secured in the other end of the cross arm of the T, and having a funnel-shaped, opening passage or venturi, 84, followed by an enlarged, cylindrical, exit bore 86, providing an abrupt shoulder at the terminus of the venturi. A rubber, delivery hose 88, of suitable length for handling distribution of the products of the gun, is secured, as by frictional fitting, to a tubular delivery nozzle 90, beveled at its outer end, for oblique mounting of a disc-like, circular, deflector plate 92, the tube being cut back somewhat in its upper half, from plate 92, as indicated by the semi-cylindrical recess or notch 94, to provide sufficient clearance for the emitted fluid. As shown by the arrows, in FIGURE 1, the resulting emission is fan-wise, and is adapted to service a relatively large area in continuous flow.

The mode of operation is generalized as follows: Water from the supply line 56 passes through the inlet pipe 52, and after passing through the restricted, outlet bore 60 passes into the enlarged chamber of the T-fitting 64, before continuing on through outlet nipple 82, tube 88 and delivery nozzle 90. The expansion of the fluid in the chamber of T 60 results in an aspirating effect, which reduces the atmospheric pressure in central, vertical pipe 68. As a consequence, any fluid which happened to be in hopper 34 and covering opening 71 at the bottom of pipe 68 would be drawn up into the main stream through T-fitting 60, at a rate which would depend upon the relative pressure and velocities involved. Thus, if the hopper contained a mixture of water and fertilizer, in solution or suspension, it would be dispensed through the exit nozzle in proportions depending upon its concentration in the hopper, and the rate of flow through pipe 68. In this mode of use, the hopper can be replenished continuously, or intermittently.

However, in the preferred mode of use, the fertilizer (or other ingredient, such as an insecticide) is charged, in a dry state, into the hopper, and removed gradually due to the wetting action of the water diverted down through branch pipe 74 from the main stream. In this action, the rate of flow through pipe 74 is so controlled by the setting of valve 78 that the rate of wetting of the solids is no more than that sufficient to condition it at a rate equal into the rate of withdrawal upward through pipe 68. By this means the wetting of the solids is not only confined to a zone near the bottom of the hopper, but is also limited in extent in its action on the individual particles of the solid. Thus, the mixture is rendered sufficiently fluid for passage through the pipe 68, and is wetted to an extent which guards against burning or otherwise harming the vegetation, but retains a degree of unsaturation so that its complete action is forestalled, pending subsequent, and more gradual action, under the influence of rainfall, or deliberate watering.

The generally conical form of the hopper is important in facilitating downward readjustment of the mass during dispensing, and in particular, it is important that the hopper wall, at the bottom, be relatively close to the pipe 68, to achieve optimum efficiency of performance.

Of importance, also, is the flattened, and flared form of the delivery end 76 of the diversion pipe 74, which is most effective in subdividing the more sizable lumps of the solid material, to better condition it for facile flow upward through pipe 68. Side wings 72 at the bottom opening 71 of the pipe also contribute to the attainment of this result.

By relating a specific amount of solid which is placed in the hopper at each charge to a given area of deposit, the uniform rate of dispensing makes possible the accurate control of amount of material deposited, with resultant economies.

After all solid material in the hopper has been exhausted, the flow of water alone may be continued, for rinsing off vegetation, if necessary, and for washing the fertilizer pellets down into intimate lodgment in the grass. If washing down plants becomes necessary prior to exhaustion of the solids in the hopper, it is a simple matter to lift the gun bodily from the hopper for the purpose. Replacement in the hopper thereafter is a simple matter.

The same result may be attained by leaving the gun in the hopper, and merely shutting off valve 78, in which case the outflow of solid material through pipe 68 ceases, and a stream of water from inlet 52, through fitting 64, and outlet nozzle 90 continues. In case any tendency to clog in pipe 68 should result from such interruption of flow therethrough, the situation may be remedied by interrupting flow through the main delivery line, as, for instance, by kinking hose 88. This causes a back flow down through pipe 68, which serves to unclog the passage.

While a certain, preferred embodiment has been shown and described, various modifications will be apparent, in the light of this disclosure, and the invention should not, therefore, be deemed as limited, except insofar as shall appear from the spirit and scope of the appended claims.

I claim:
1. A delivery gun, adapted to mix fluid and solid matter, comprising a T-fitting having axially aligned openings and a lateral opening with axis perpendicular to that of said aligned openings, an entrance tube threadedly received in one of said aligned openings, and having a tapered, end nozzle, with restricted bore, within said fitting, and substantially spaced from the inner wall thereof, said entrance tube having an obliquely inclined lateral port, outwardly of said fitting, a pipe secured in the lateral opening in said fitting and having a closed outer end, with a lateral opening adjacent thereto, a conduit including a valve, leading from said obliquely inclined port, secured to said pipe, and having a terminal, open, flattened and flared end adjacent the lateral opening in said pipe, the bore of said conduit being substantially less than that of said pipe, a tubular nipple having a venturi throat, secured in the other of said aligned openings in said fitting, a flexible tube secured to said nipple, a delivery nozzle carried by the outer end of said tube, the outer end of said delivery nozzle having a semi-cylindrical recess, and a disc-form deflector arranged at an oblique angle to the axis of said delivery tube, at the outer end of said recess.

2. In combination with the gun of claim 1, a frusto-conical hopper, with large, open end uppermost, and a closed, downwardly dished, small end, having leg means for upright support, the said pipe of said gun being supported on the inner surface of said small end, and a bale carried by the open end of said hopper, and having a central, hooked portion engaging said fitting.

3. In combination with the device of claim 2, a tote cart having a top surface with a recess, and uprights supporting a ring, the legs of said hopper being fitted in said recess, and the wall of said hopper dwelling on said ring.

4. A delivery gun, adapted to mix fluid and solid matter, comprising a fitting having aligned openings and a lateral opening, an entrance tube threadedly received in one of said aligned openings, and having a tapered, end nozzle, with restricted bore, within said fitting, and substantially spaced from the inner wall thereof, said entrance tube having an obliquely inclined lateral port, outwardly of said fitting, a pipe secured in the lateral opening in said fitting and having closed outer end, with a lateral opening adjacent thereto, a conduit including a valve, leading from said obliquely inclined port, secured to said pipe, and having a terminal, open, flattened and flared end adjacent the lateral opening in said pipe, the bore of said conduit being substantially less than that of said pipe, a tubular nipple having a venturi throat, secured in the other of said aligned openings in said fitting, a flexible tube secured to said nipple, a delivery nozzle carried by the outer end of said tube, the outer end of said delivery nozzle having a semi-cylindrical recess, and a disc-form deflector at the outer end of, and arranged at an oblique angle to, the axis of said delivery tube.

5. A delivery gun, adapted to mix fluid and solid matter, comprising a fitting having aligned openings and a lateral opening, an entrance tube threadedly received in one of said aligned openings, and having a tapered, end nozzle, with restricted bore, within said fitting, and substantially spaced from the inner wall thereof, said entrance tube having a lateral port, outwardly of said fitting, a pipe secured in the lateral opening in said fitting and having a closed outer end, with a lateral opening adjacent thereto, a conduit including a valve, leading from said lateral port, secured to said pipe, and having a terminal, open, flattened and flared end adjacent the lateral opening in said pipe, the bore of said conduit being substantially less than that of said pipe, a tubular nipple having a venturi throat, secured in the other of said aligned openings in said fitting, a flexible tube secured to said nipple, a delivery nozzle carried by the outer end of said tube, the outer end of said delivery nozzle having a semi-cylindrical recess, and a disc-form deflector on the outer end of said nozzle, and arranged at an oblique angle to the axis of said delivery tube.

6. A delivery gun, adapted to mix fluid and solid matter, comprising a fitting having aligned openings and a lateral opening, an entrance tube threadedly received in one of said aligned openings, and having a tapered, end nozzle, with restricted bore, within said fitting, and substantially spaced from the inner wall thereof, said entrance tube having a lateral port, outwardly of said fitting, a pipe secured in the lateral opening in said fitting and having a closed outer end, with a lateral opening adjacent thereto, a conduit including a valve, leading from said lateral port, secured to said pipe, and having a terminal, open, flattened and flared end adjacent the lateral opening in said pipe, a tubular nipple having a venturi throat, secured in the other of said aligned openings in said fitting, a flexible tube secured to said nipple, a delivery nozzle carried by the outer end of said tube, the outer end of said delivery nozzle having a notch, and a disc-form deflector arranged at an oblique angle to the axis of said delivery tube.

7. A delivery gun, adapted to mix fluid and solid matter, comprising a fitting having aligned openings and a lateral opening, an entrance tube threadedly received in one of said aligned openings, and having a tapered, end nozzle, with restricted bore, within said fitting, and substantially spaced from the inner wall thereof, said entrance tube having a lateral port, outwardly of said fitting, a pipe secured in the lateral opening in said fitting and having a closed outer end, with a lateral opening adjacent thereto, a conduit including a valve, leading from said lateral port, secured to said pipe, and having a terminal, open, flattened and flared end adjacent the lateral opening in said pipe, a tubular nipple having a venturi throat, secured in the other of said aligned openings in said fitting, a flexible tube secured to said nipple, and a delivery nozzle carried by the outer end of said tube, the outer end of said delivery nozzle having a disc-form deflector arranged at an oblique angle to the axis of said delivery tube.

8. A delivery gun, adapted to mix fluid and solid matter, comprising a fitting having aligned openings and a lateral opening, an entrance tube threadedly received in one of said aligned openings, and having a tapered, end nozzle with restricted bore, within said fitting, and substantially spaced from the inner wall thereof, said entrance tube having a lateral port, outwardly of said fitting, a pipe secured in the lateral opening in said fitting and having a closed outer end, with a lateral opening adjacent thereto, a conduit including a valve, leading from said lateral port, secured to said pipe, and having a terminal, open, flattened and flared end adjacent the lateral opening in said pipe, a tubular nipple secured in the other of said aligned openings in said fitting, a flexible tube secured to said nipple, and a delivery nozzle carried by the outer end of said tube, the outer end of said delivery nozzle having a disc-form deflector arranged at an oblique angle to the axis of said delivery tube.

9. A delivery gun, adapted to mix fluid and solid matter, comprising a fitting having aligned openings and a lateral opening, an entrance tube threadedly received in one of said aligned openings, and having a tapered, end nozzle, with restricted bore, within said fitting, and substantially spaced from the inner wall thereof, said entrance tube having a lateral port, outwardly of said fitting, a pipe secured in the lateral opening in said fitting and having a closed outer end, with a lateral opening adjacent thereto, a conduit including a valve, leading from said lateral port, secured to said pipe, and having a terminal, open, flattened and flared end adjacent the lateral opening in said pipe, a flexible tube secured in the other of said aligned openings in said fitting, and a delivery nozzle carried by the outer end of said tube, the outer end of said delivery nozzle having disc-form deflector arranged at an oblique angle to the axis of said delivery tube.

10. A delivery gun, adapted to mix fluid and solid matter, comprising a fitting having aligned openings and a lateral opening, an entrance tube received in one of said aligned openings and having an end nozzle within said fitting and substantially spaced from the inner wall thereof, said entrance tube having a lateral port, outwardly of said fitting, a pipe secured in the lateral opening in said fitting and having a lateral opening adjacent its outer end, a conduit including a valve, leading from said lateral port, secured to said pipe, and having a terminal, open, flattened and flared end adjacent the lateral opening in said pipe, a flexible tube secured in the other of said aligned openings in said fitting, and a delivery nozzle carried by the outer end of said tube.

References Cited in the file of this patent

UNITED STATES PATENTS

| | | |
|---|---|---|
| 552,000 | Randall et al. | Dec. 24, 1895 |
| 1,668,080 | Mack | May 1, 1928 |
| 1,769,428 | Gatchet | July 1, 1930 |
| 2,029,408 | Bramsen et al. | Feb. 4, 1936 |
| 2,550,303 | Simpson | Apr. 24, 1951 |
| 2,934,241 | Akesson | Apr. 26, 1960 |